United States Patent [19]

Castela

[11] 3,838,709

[45] Oct. 1, 1974

[54] DEVICE FOR COUPLING HYDRAULIC PIPES ASSOCIATED TO APPARATUSES WHICH ARE RELEASABLY CONNECTED TO EACH OTHER

[75] Inventor: André Castela, Le Mesnil Le Roi, France

[73] Assignees: Institut Francais Du Petrole, Des Carburants Et Lubrifiants, Rueil-Malmaison; Compagnie Francaise Des Petroles, Paris, both of, France

[22] Filed: May 2, 1973

[21] Appl. No.: 356,389

[30] Foreign Application Priority Data
May 9, 1972 France ............................. 72.16614

[52] U.S. Cl. ........................... 137/614.02, 285/131
[51] Int. Cl. ........................................... F16l 37/28
[58] Field of Search . 137/608, 614, 614.01, 614.02, 137/614.03, 614.04, 614.05, 614.06, 594, 515, 149.6; 285/24, 27, 131, 132, 137 R, 137 A

[56] References Cited
UNITED STATES PATENTS

| | | | |
|---|---|---|---|
| 2,898,130 | 8/1959 | Hansen ...................... | 137/614.04 X |
| 3,459,442 | 8/1969 | DeYarnett et al. ................... | 285/27 |
| 3,551,005 | 4/1969 | Brun ........................... | 285/137 R X |
| 3,701,549 | 10/1972 | Kooney et al. ...................... | 285/131 |

Primary Examiner—William R. Cline
Assistant Examiner—Ira S. Lazarus
Attorney, Agent, or Firm—Craig and Antonelli

[57] ABSTRACT

This device which is suitable for equipping elements of an underwater wellhead, comprises toothed crown-shaped elements secured to each of the apparatuses which must be releasably connected.

These crown-shaped elements cooperate for automatically providing an accurate relative positioning of the two apparatuses, so that a group of connecting means of one apparatus registers with a complementary group of connecting means of the other apparatus.

12 Claims, 7 Drawing Figures

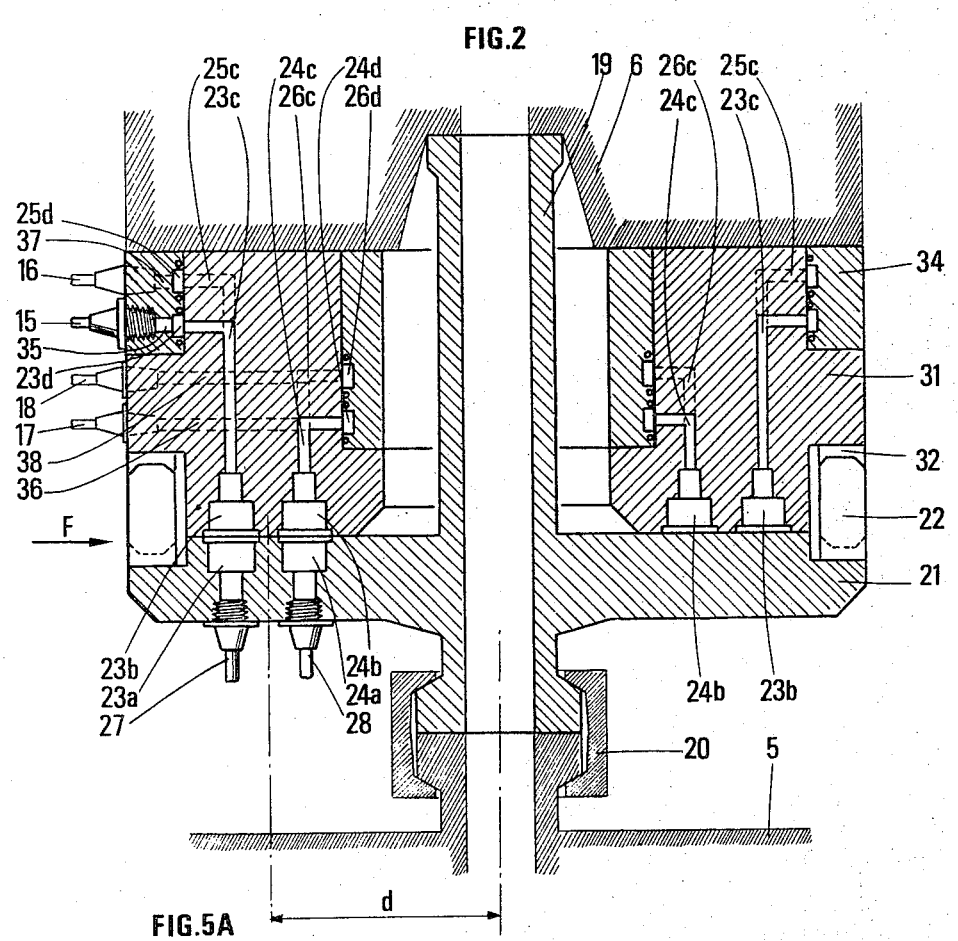
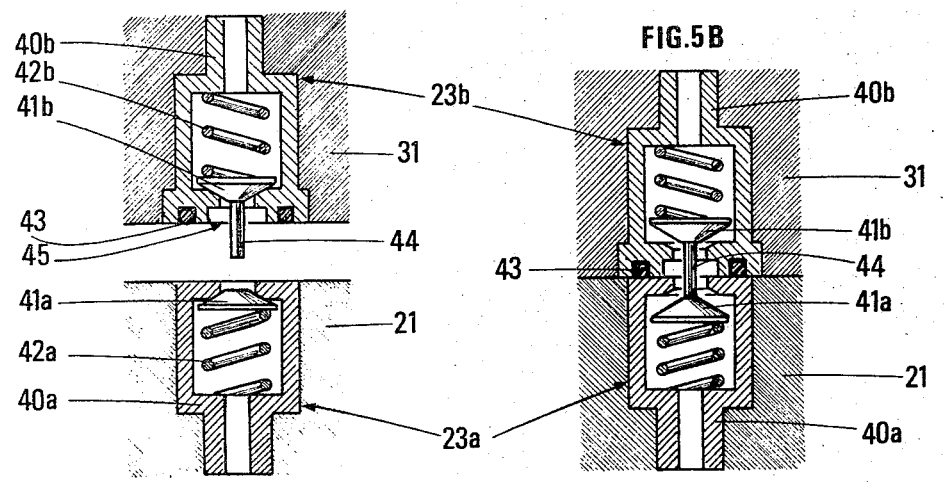

DEVICE FOR COUPLING HYDRAULIC PIPES ASSOCIATED TO APPARATUSES WHICH ARE RELEASABLY CONNECTED TO EACH OTHER

The present invention relates to a device for coupling hydraulic pipes associated to apparatuses which are releasably connected to each other.

More particularly but not limitatively, the present invention relates to a device for hydraulic coupling between apparatuses or elements constituting an underwater wellhead.

At the present time, when drilling offshore oil wells, the wellhead is located in close vicinity to the water bottom, irrespective of the water depth, thereby avoiding in particular, to encumber the navigable waters.

The well head which overtops the well comprises an element called blow-out preventer, or B.O.P.

This B.O.P., secured to the well tubing through a connector is usually hydraulically actuated through a hydraulic block, associated to the B.O.P. and remotely controlled from a surface installation.

The maintenance and repairing operations on the B.O.P. require the raising of this B.O.P. to the surface and, consequently, during such operations the well is no longer obturated.

In order to prevent the discharge of oil products into the sea it is possible to introduce into the well a device for temporary obturating the later.

However, positioning such a device is the more difficult and time consuming as the water depth increases.

The obturation of the well is theefore achieved by injection of muds having a selected specific gravity.

At present, for obvious safety reasons, it is preferred to secure directly to the well inlet, through a hydraulic connector, a safety B.O.P. overtopped by a main B.O.P which is connected to this safety B.O.P. through another hydraulic connector, The safety B.O.P.. which is of a reduced size, is used for obturating the well only when the main B.O.P. has been raised to the water surface. The safety B.O.P. and its hydraulic connector are thus used only exceptionally and are practically always actuated through the hydraulic connector of the main B.O.P., before the later is raised to the water surface.

The problem to be solved is then to provide for the uninterrupted connection of the hydraulic circuits between the hydraulic connector associated to the main B.O.P., on the one hand, and the safety B.O.P. and its hydraulic connector, on the other hand, when the main B.O.P. is put back to its initial position.

It might be contemplated to use a hydraulic connecting device, located at some distance from the well axis and constituted by two elements, one of which being provided with a conical bore whereinto can be introduced and locked a complementary element. The continuity of the hydraulic circuits might thus be achieved through cooperation of circular grooves provided in these two elements respectively.

This solution suffers from some drawbacks, among which is the requirement of positioning with a sufficient accuracy the elements to be connected, the difficulty to provide a good sealing between the grooves corresponding to different hydraulic circuits when the assembled elements are of large diameters, with moreover the risks of the breaking of the hydraulic connection under the action of the forces (sometimes exceeding 100 tons) which are generated by the pressure differences prevailing at the level of the connected elements.

The main objects of the present invention is accordingly to provide a device for hydraulic connections which does not suffer from the drawbacks of the above-mentioned devices.

More particularly, the object of the present invention is to provide a simple and tough device for hydraulic connections, which does not require during its positioning an accurate relative orientation of the elements constituting an underwater well head.

The invention will be better understood and other advantages thereof will appear from the following description of a non-limitative embodiment thereof, illustrated by the accompanying drawings, wherein:

FIG. 2 illustrates an embodiment of the invention,

Figure 4:
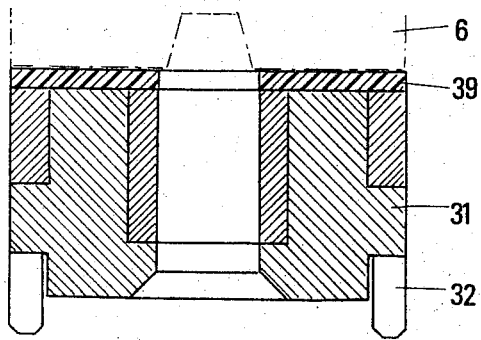
Figure 6:
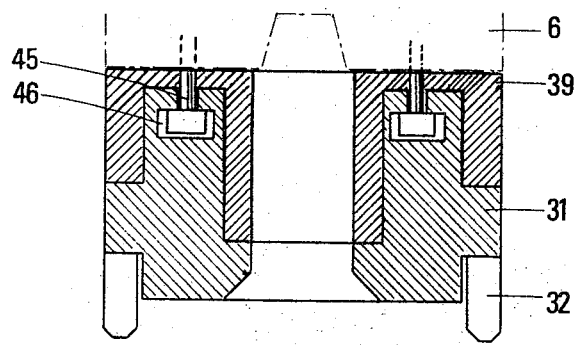

FIG. 4 diagrammatically illustrates a modification of the device according to FIG. 2, FIGS. 5A and 5B show a hydraulic connecting valve, and FIG. 6 diagrammatically illustrates another modification of the device according to FIG. 2.

Throughout the specification and drawings, the same reference numerals have been used to designate same elements.

Figure 1:
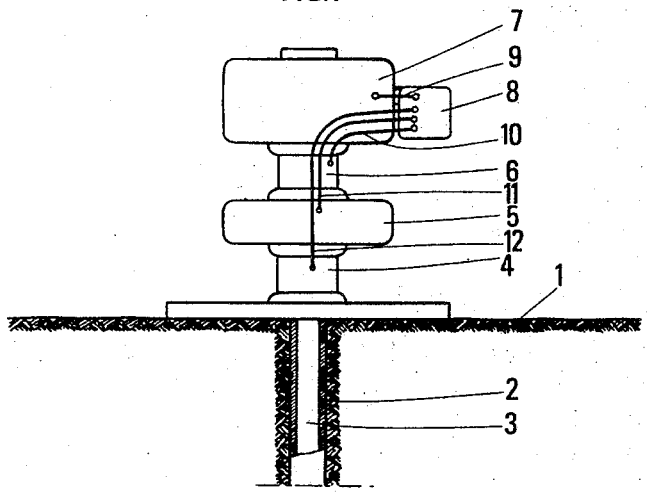
FIG. 1 is a diagrammatic view of an underwater well head.

FIG. 1 diagrammatically illustrates an underwater well head, located in the immediate vicinity of the water bottom 1. A blow-out preventer for the well 5, (hereinafter called B.O.P.) is secured through a hydraulic connector 4, at the top of a tubing 2 positioned in the well 3.

Above B.O.P. 5 is located another B.O.P. 7, to which is associated a hydraulic assembly 8, which can be remotely controlled from a surface installation (not shown). B.O.P. 5 and 7 are releasably connected to each other through an hydraulic connector 6 secured to B.O.P. 7.

The B.O.P. 7, which is the main, provides for all the conventional functions, such as complete obturation of the well, sealing around the drill string, connection with the safety piping, etc.

The B.O.P. 5 is a safety B.O.P. providing for the complete obturation of the well, exclusively when the main B.O.P 7 and its connector 6 are raised to the water surface. B.O.P. 5 and 7 and the connectors 4 and 6 are hydraulically actuated.

A hydraulic assembly 8, supplying the hydraulic fluid, feeds the main B.O.P. 7 and the connector 6 through circuits which are diagrammatically illustrated at 9 and 10 respectively and feeds the safety B.O.P. 5 and the hydraulic connector 4 through circuits diagrammatically illustrated at 11 and 12.

The continuity of the hydraulic circuits 11 and 12 is achieved through a connecting device which will be described in detail, with reference to FIG. 2.

As already pointed out, when the main B.O.P. 7 and its connector 6 must be put back to their respective positions, after a maintenance or repairing operation during which the B.O.P. 7 has been raised to the water surface, it is desirable to avoid than an accurate positioning of the two B.O.P. relative to each other be necessary for reestablishing the continuity of the hydraulic circuits 11 and 12.

FIG. 2 diagrammatically shows an axial section of a device for hydraulic connection, according to the invention, which can be used with already existing wellhead completion equipement without requiring any modification of the later.

The device according to the invention, shown in solid lines is placed between the connector 6 and the safety B.O.P. 5, which are represented with thinner lines.

In the embodiment illustrated by this figure, the device ensures the hydraulic continuity of four circuits (this number being by no way limitative), fed from the hydraulic assembly 8 through pipes 15 to 18.

The device comprises a tubular element 19 whose inner diameter is equal to the inner diameters of the safety B.O.P. 5 and of the connector 6.

The lower end of the element 19 is secured to the safety B.O.P. 5 through any known device, indicated by reference numeral 20. The hydraulic connector 6 rests on the top of the tubular element 19 to which it is releasably secured when the connector 6 is hydraulically actuated.

A circular plate or support member 21, fixed to the tubular element 19 is provided with a toothed crown-shaped element 22. Four valves 23 a, 24 a, 25 a and 26 a are provided in the plate 21, each of these valves constituting one connecting element of the means for hydraulic connection formed by pairs of complementary connecting elements (only two of these pairs of connecting elements are shown in FIG. 2). Each of these valves communicates with a hydraulic pipe (pipes 27, 28, 29 and 30 respectively). This group of four valves is placed at a distance d from the well axis.

Two of these pipes, for example, feed the safety B.O.P. 5 connected therewith and the other two pipes feed the hydraulic connector 4 with pressurized fluid.

An annular element 31 is secured to the connector 6 through any known means.

This element is provided at its periphery with a toothed crown-shaped element 32 complementary to the toothed crown-shaped element 22. Both of these crown-shaped elements have a number $n$ of teeth determined by the technician.

In the illustrated embodiment $n = 18$. The annular element 31 is provided with $n$ groups of four valves 23 b, 24 b, 25 b and 26 b (constituting the connecting elements complementary to the respective connecting elements 23 a to 26 a of the hydraulic connecting means) placed at the same distance $d$ from the well axis and distributed substantially on a circle.

These valves communicate with hydraulic pipes 15, 17, 16 and 18 respectively. Thus when the teeth of the toothed crown-shaped element 32 are in mesh with those of the toothed crown-shaped element 22, there is always a group of valves 23 b to 26 b which cooperates with the valves 23 a to 26 a and provides for hydraulic connection between pipes 15 to 18 and pipes 27 to 30. In other words the angular interval between two consecutive groups is equal to the angular interval between two consecutive teeth of the crown 32, the width of each group being at most equal to distance between the teeth.

All the valves 23b are supplied with hydraulic fluid through pipes 23 c provided in the annular element 31, these pipes opening, for example, into the outer cylindrical wall of this element 31 in a slot 23 d provided in an annular element 34 surrounding the element 31 to which it is secured. The slot 23 d communicates with a hydraulic pipe 15 through a pipe 35 provided in the annular element 34.

All of the valves 24 b are fed in parallel from pipe 17 connected through pipe 36 to an annular groove 24 d into which open the pipes 24 c communicating with the valves 24 b.

The valves 25 b are fed in parallel from pipe 16 connected through pipe 37 to an annular groove 25 d into which open the pipes 25 c communicating with the valves 25 b.

The valves 26 b are fed in parallel from the hydraulic pipe 18 connected through pipe 38 to an annular groove 26 d into which open the pipes 26 c communicating with the valves 26 b.

Figure 3:
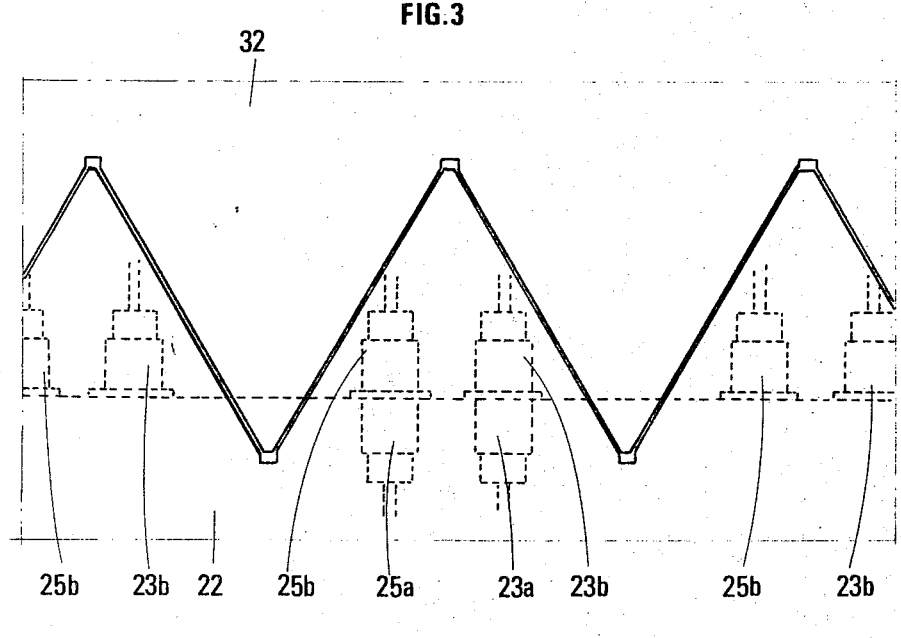
FIG. 3 is partial view of FIG. 2, developed along the direction of arrow F.

FIG. 3 is a partial view developed, following the arrow F, of the device illustrated by FIG. 2. It is apparent in this drawing that the $n$ groups of valves 23 b to 25 b are spaced from one another by a distance equal to the distance between the teeth of the toothed crown-shaped elements 22 and 32.

In this way, after an operation has been carried out at the water surface on the main B.O.P. 7, this B.O.P. and its connector 6 placed back onto the wellhead, it is not necessary to put the B.O.P. 7 into a precise position with respect to the B.O.P. 5.

A slight correction of the relative angular positioning of these B.O.P. results automatically from the co-action of the toothed crown-shaped elements 32 and 22 which causes a slight rotation of the B.O.P. 7 about its axis, so that any of the $n$ group of valves 23 b to 25 b carried by the element 31 secured to the connector 6 registers exactly with the group of valves 23 a to 26 a carried by the plate 21, this rotation being preformed in either direction over an angle at most equal half the angle corresponding to the interval between the teeth of the toothed crown-shaped elements 22 and 32.

It will be possible, without departing from the scope of the invention, to incorporate during the construction, the elements constituting the device of the invention, to the connector 6 and to the safety B.O.P. 5 or to incorporate pipes such as 15 to 18 and 27 to 30 to the connector 6 and to the B.O.P. 5 respectively.

According to a modification of the invention, one of the constituting elements of the device, for example the support element 31 or the plate 21, may be subjected, with respect to the element of the wellhead to which it is associated, to a rotation in either direction, over an angle at least equal to half the angular distance between consecutive teeth, so that when the connector 6 is put in position, the positioning of the teeth of the crown-shaped element 32 relative to that of crown-shaped element 22 becomes easier, without causing any rotation of the connector 6 and of the main B.O.P. 7.

To this purpose, the element 31 may be connected to the connector 6 through coupling means allowing the rotation of this element 31 about its vertical axis.

An embodiment is diagrammatically illustrated by FIG. 6 in which the element 31 is fixed by screws 45 whose heads are housed in an annular groove 46 provided in the element 31.

It will also be possible, for example, to place between the element 31 and the connector 6 a plate 39 of a resiliently deformable material, such as reinforced rubber, as diagrammatically shown by FIG. 4, to compensate for the clearances provided for assembling the elements and permit a good relative positioning of the valves such as 23 a and 23 b.

Obviously, any other resilient means, such as springs, may be substituted for the plate 39.

FIG. 5 A shows the valves 23 a and 23 b equipping the elements 21 and 31.

The bodies 40 a and 40 b of valves 23 a and 23 b are provided with flaps 41 a and 41 b pressed against their seats through spring means 42 a and 42 b, when the elements 31 and 21 are spaced from each other, thus obturating the pipes to which they are connected.

Of course the springs 42 a and 42 b are so calibrated as to press the flaps on their seats against the antagonistic action of the hydrostatic pressure. In this position the hydraulic circuit is interrupted.

The body 40 b of the valve 23 b is provided, in the vicinity of the contact surface between the two valves, with sealing joints 43, such as O-ring type joints, for the sealing around the valves. One of the flaps, for example flap 41 b has a cylindrical protrusion 44 extending beyond the contact surface 45 of the valves.

When the valves are closed, as illustrated by FIG. 5 B, the protrusion 44 maintains between the flaps 41 a and 41 b a distance which is greater than the distance between the seats of these flaps. The flaps thus give passage to the hydraulic fluid, while in the same position, the joint 43 provided for the sealing.

As apparent from FIG. 5 B, the joint 43 is of a small size.

It will obviously also be possible to use other types of valves and further modifications can be made without departing from the scope of the present invention. For example, the plate 21 may be equipped with $m$ groups of valves 23 a to 26 a, the number of groups of valves 23 b to 26 b being then at least equal to the ratio of the number $n$ of teeth of the toothed crown-shaped elements to the number $m$ of groups of valves in the plate 21. It will then be possible to secure the plate 21 and the element 31 to the B.O.P. 5 and to the connector 6 respectively, through means permitting their rotation about the well axis.

What I claim is:

1. A device providing for the continuity of hydraulic circuits associated to apparatuses releasably connected to each other, which comprise pipes associated to said apparatuses releasably secured to each other in a position of closeness, in which an axis of a first apparatus is in line with one axis of a second apparatus, this device comprising means for connecting hydraulic pipes consisting of a first and a second complementary means including a first support element secured to said first apparatus, a first toothed crown-shaped element secured to said first support element and coaxial with said first apparatus, a second support element secured to said second apparatus, a second toothed crown-shaped element secured to said second support element and coaxial with said second apparatus, said crown-shaped elements having the same number of teeth of substantially the same size, said first support element being provided with at least one group of first connecting elements, placed at a predetermined distance from the axis of said first apparatus, said second support element being provided with a plurality of groups of second connecting elements complementary to said first connecting elements and distributed about the axis of said second apparatus, on a circle having a radius equal to said predetermined distance, the angular interval between two consecutive groups of second connecting elements being equal to the angular interval between two consecutive teeth of said toothed crowns, each of the pipes associated with each apparatus being coupled to a connecting element of each group carried by the support element secured to this apparatus and the teeth of said crown-shaped elements being in mesh with one another when the two apparatuses are close to each other, thus automatically positioning said support members so that the second connecting elements of one of the groups carried by said second support element cooperate with said first connecting elements carried by said first support element.

2. A device according to claim 1, wherein the number of groups of second connecting elements carried by the second support member is at least equal to the ratio of the number of teeth of one of said crown-shaped element to the number of groups of first connecting members carried by said first support element.

3. A device according to claim 2, wherein the teeth of crown-shaped elements have a substantially triangular shape.

4. A device according to claim 2, wherein said first and second elements constituting said connecting means for the hydraulic pipes are adapted to obturate said pipes to which they are connected when the two apparatuses are spaced from each other and to bring in communication the two pipes to which they are connected, exclusively when the two apparatuses are close to each other.

5. A device according to claim 2, wherein said support elements are formed by said two apparatuses.

6. A device according to claim 2, wherein at least one of said support elements is connected to the corresponding apparatus through coupling means permitting a rotation of said support element about the axis of said apparatus.

7. A device according to claim 6, wherein said coupling means are resilient means permitting a limited rotation of said support element.

8. A device according to claim 7, wherein said resilient means are formed by an elastomeric element, connecting said apparatus to said support element.

9. A device according to claim 4, wherein said first and second connecting elements are formed by a body housing a flap pressed against a seat under the action of resilient means when the two apparatuses are substantially spaced from each other, at least one of said flaps of the two connecting members being provided with a rod projecting beyond the body of said connecting element, this rod bearing against the flap of the complementary connecting element and displacing the flaps of the two connecting elements against the antagonistic action of spring means in the position of closeness of the two apparatuses.

10. A device for providing for the continuity of hydraulic circuits associated to apparatuses releasably connected to each other, which comprises pipes associated to said apparatuses releasably secured to each other in a position of closeness, in which an axis of a first apparatus is in line with an axis of a second apparatus, the device comprising: a first support element secured to said first apparatus, a first toothed crown-shaped element secured to said first support element and coaxial with said first apparatus, a second support element secured to said second apparatus, a second toothed crown-shaped element secured to said second support element and coaxial with said second apparatus, the teeth of one of said crowns being in mesh with the teeth of the other of said crowns when said apparatuses are in said position of closeness, said first support element being provided with at least one group of first elements for connecting said pipes, said group being placed at a predetermined distance from the axis of said first apparatus, said second support element being provided with a plurality of groups of second elements, complementary to said first connecting elements, for connecting said pipes, said groups being distributed about the axis of said second apparatus on a circle having a radius equal to said predetermined distance, said pipes associated to said apparatus comprising a first group of pipes each of which is coupled to at least one connecting element of said group of first elements provided on said first support element, and a second group of pipes each of which is coupled to at least one connecting element of each group of said second connecting elements provided on said second support element, the groups of said second connecting elements thus being coupled in parallel with said pipes associated with said second support element whereby in the position of closeness of said apparatuses, the meshing of the teeth of said toothed crowns automatically causes said group of first connecting elements to register with one of said groups of second connecting elements.

11. A hydraulic coupling arrangement for releasably coupling at least a pair of elements each of which is provided with a plurality of hydraulic conduits, the arrangement comprising: a first support means provided on one of said pair of elements, a first toothed means secured to said first support element coaxially of said one of the pair of elements, a second support element provided on the other of the pair of elements, a second toothed means secured to said second support element coaxially of said other of the pair of elements, said first and second toothed means being meshed when the pair of elements are coupled, at least one group of first connecting means provided on said first support element operatively connected with the hydraulic conduits of said one of the pair of elements, said at least one group of first connecting means including a plurality of individual connectors disposed on said first support element, a plurality of second connecting means provided on said second support element operatively connected with the hydraulic conduits provided in said other of the pair of elements, said second connecting means being divided into a plurality of individual groups with each of said individual groups consisting of individual connectors equal in number to the plurality of connectors provided on said first support element, said individual groups of second connectors being disposed on said second support element at an angular interval equal to the angular interval between two consecutive teeth of said toothed means, whereby said at least one group of first connectors is coupled with one individual group of said plurality of groups of second connectors when said first and second toothed means are meshed.

12. An arrangement according to claim 11, wherein the number of individual groups of said second connectors is at least equal to the number of teeth provided on said toothed means.

* * * * *